United States Patent
Yoshida et al.

[19]

[11] Patent Number: 5,997,303
[45] Date of Patent: Dec. 7, 1999

[54] ROTARY SLIDING DEVICE AND A SIMULATOR USING THE SAME

[75] Inventors: Hirotada Yoshida; Yuichiro Ishitsubo; Junichiro Koyama, all of Kanagawa, Japan

[73] Assignee: Namco Ltd., Tokyo, Japan

[21] Appl. No.: 09/034,882

[22] Filed: Mar. 4, 1998

[30] Foreign Application Priority Data

Mar. 4, 1997 [JP] Japan ..................................... 9-065503

[51] Int. Cl.⁶ .................................................. G09B 9/04
[52] U.S. Cl. ............................... 434/62; 434/61; 434/67; 472/131; 472/16
[58] Field of Search ................................ 434/61, 55, 62, 434/67, 247, 253, 29, 30; 472/60, 130, 131, 59, 14, 16, 17, 21

[56] References Cited

U.S. PATENT DOCUMENTS

| | | | |
|---|---|---|---|
| 4,066,256 | 1/1978 | Trumbull | 472/60 |
| 4,276,030 | 6/1981 | Radice | 472/60 |
| 4,978,300 | 12/1990 | Letovsky | 434/61 |
| 5,346,398 | 9/1994 | Nakahata | 434/70 |
| 5,527,184 | 6/1996 | Trumbull | 434/69 |
| 5,669,773 | 9/1997 | Gluck | 434/62 |
| 5,813,864 | 9/1998 | Ikuta | 434/253 |
| 5,853,330 | 12/1998 | Engstrand | 472/60 |

FOREIGN PATENT DOCUMENTS

| | | | |
|---|---|---|---|
| 60-119969 | 12/1983 | Japan | 434/247 |
| 4-150877 | 5/1992 | Japan | 434/247 |

*Primary Examiner*—Robert A. Hafer
*Assistant Examiner*—Kurt Fernstrom
*Attorney, Agent, or Firm*—Limbach & Limbach, LLP

[57] ABSTRACT

A rotary sliding device which can perform agile motion, without the need to make the driving means large, and a simulator using the same, are disclosed. The rotary sliding device includes first and second sliding plates 32 which slide in parallel and separately with a predetermined interval, a pair of stepping motors 20 for separately sliding said sliding plates 32, and a moving plate 12 and a seat 32. The first sliding plate 32 is connected to the moving plate 12 so as to allow it to rotate only around the rotation axis 38, and the second sliding plate 32 is connected to the moving plate 12 so as to engage therewith in a sliding direction, and to allow the moving plate 12 to move in the crossover direction to the sliding direction and to rotate by means of a roller 64.

19 Claims, 5 Drawing Sheets

ROTARY SLIDING DEVICE AND A SIMULATOR USING THE SAME

BACKGROUND OF THE INVENTION

1. Field of the Invention

The present invention relates to a rotary sliding device and a simulator using the same, and more specifically, to a rotary sliding device capable of agile motion and a simulator using the same.

2. Description of the Related Art

Recently, simulators have been widely used for bodily-sensing games or various training. Since simulators are to let people have the same feeling as in the actual vehicles, the same motion is required as in the actual vehicles. Particularly in the bodily-sensing games, simulation apart from the usual life, such as driving a combat car and manipulating a robot is performed other than in racing games. In such a simulation, it is important how agilely is performed the motion to rotate as well as slide the seat of a player back and forth, or from side to side. In this behalf, with conventional simulators, it has been necessary to make them large in order to move agilely heavy materials such as a seat on which a player sits.

SUMMARY OF THE INVENTION

One purpose of the present invention is to solve these problems in the conventional art, and among the objects of the present invention is to provide a rotary sliding device which can perform agile motion, avoiding to make the driving means large, and a simulator using the same.

In order to attain the above objects, the invention includes a rotary sliding device having first and second straight movement means which slide in parallel and separately with a predetermined interval, a pair of driving means for separately sliding the respective straight movement means, and an object to be moved which is slid or turned around by the first and second straight movement means.

The first straight movement means is connected to the object to be moved so as to allow it to rotate only around a first rotating portion.

The second straight movement means is connected to the object to be moved so as to engage therewith in a sliding direction, and to allow the object to be moved to move in the crossover direction to the sliding direction and to rotate around a second rotating portion.

According to the present invention, the object to be moved is slid and turned around by means of the first and second straight movement means.

In detail, the first straight movement means is connected to the object to be moved, therefore when the first straight movement means is slid, the object to be moved is also slid therewith. The second straight movement means is connected to the object to be moved so as to engage therewith in a sliding direction, therefore when the second straight movement means is slid, the object to be moved is also slid therewith.

Therefore, when the first and second straight movement means slide simultaneously in the same direction, the object to be moved also slides in the same direction.

Furthermore, the object to be moved can rotate against the first straight movement means, and also rotate against the second straight movement means. Therefore, when the first and second straight movement means slide in the opposite direction, a force is applied to rotate object to be moved.

In addition, the object to be moved and the second straight movement means are able to move relatively in a crossover direction to the sliding direction. Therefore, the rotation of the object to be moved can fit to the change of distance between the first rotating portion and the second rotating portion.

Thus, according to the present invention, the object to be moved can be rotated to turn around, in addition to being slid.

Furthermore, since the first and second straight movement means are spaced apart, the object to be moved can be rotated around two points spaced apart. Therefore, the object to be moved can be rotated with a larger force than being rotated around one point, thus an agile movement becomes possible. Or, since the object to be moved is rotated around two points, the moving distance at one point can be made small, thereby an agile movement becomes possible.

In another aspect of the present invention the driving device may include a helical body and a motor for rotating the helical body, and the straight movement means may include a portion to be screwed with the helical body.

According to this aspect of the present invention, by moving the portion to be screwed by the rotation of the helical body, the object to be moved can be slid. And the rotation force of the helical body is decelerated by screwing and transmitted to the portion to be screwed, thereby the first and the second straight movement means are driven by a large force. Or, the first and the second straight movement means can be driven by a small driving force.

Another aspect of the present invention is a simulator having a rotary sliding device as described above. Thus, the rotary sliding device may be applied particularly to a simulator.

In another aspect of the present invention the object to be moved may be a seat on which a player sits.

According to this aspect of the present invention, the seat is slid to turn around. When a player sits on the seat, the seat becomes heavy. Therefore, it is preferable that the rotary sliding device can generate a large force with the interjacent decelerating means described above.

In another aspect of the present invention the seat slides back and forth to the direction to which the player sits.

In another aspect of the present invention the seat slides from side to side to the direction to which the player sits.

Thus, as a simulator, it is preferable that the seat slides back and forth and from side to side, and for that purpose, it is preferred to use the rotary sliding device according to the present invention.

In another aspect of the present invention the simulator, described above, has a pair of operation means to operate separately each of the pair of driving means in order to slide each of the first and second straight movement means separately in a reciprocating direction.

For example, with a simulator of a combat car, by operating right and left caterpillars separately, advance and retreat, and right and left evolution can be performed.

In another aspect of the present invention the simulator, described above, has an operation means for operating the pair of driving means so that the first and second straight movement means slide in an opposite direction to reverse the direction of the seat.

Such a simulator can be used, for example, for a racing game.

In another aspect of the present invention the seat slides in the same direction with that of a force given from the seat to the player in a virtual space.

According to the present invention, as described above, the player can feel the gravity when the simulator accelerates or stops all of a sudden, or in dogleg.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
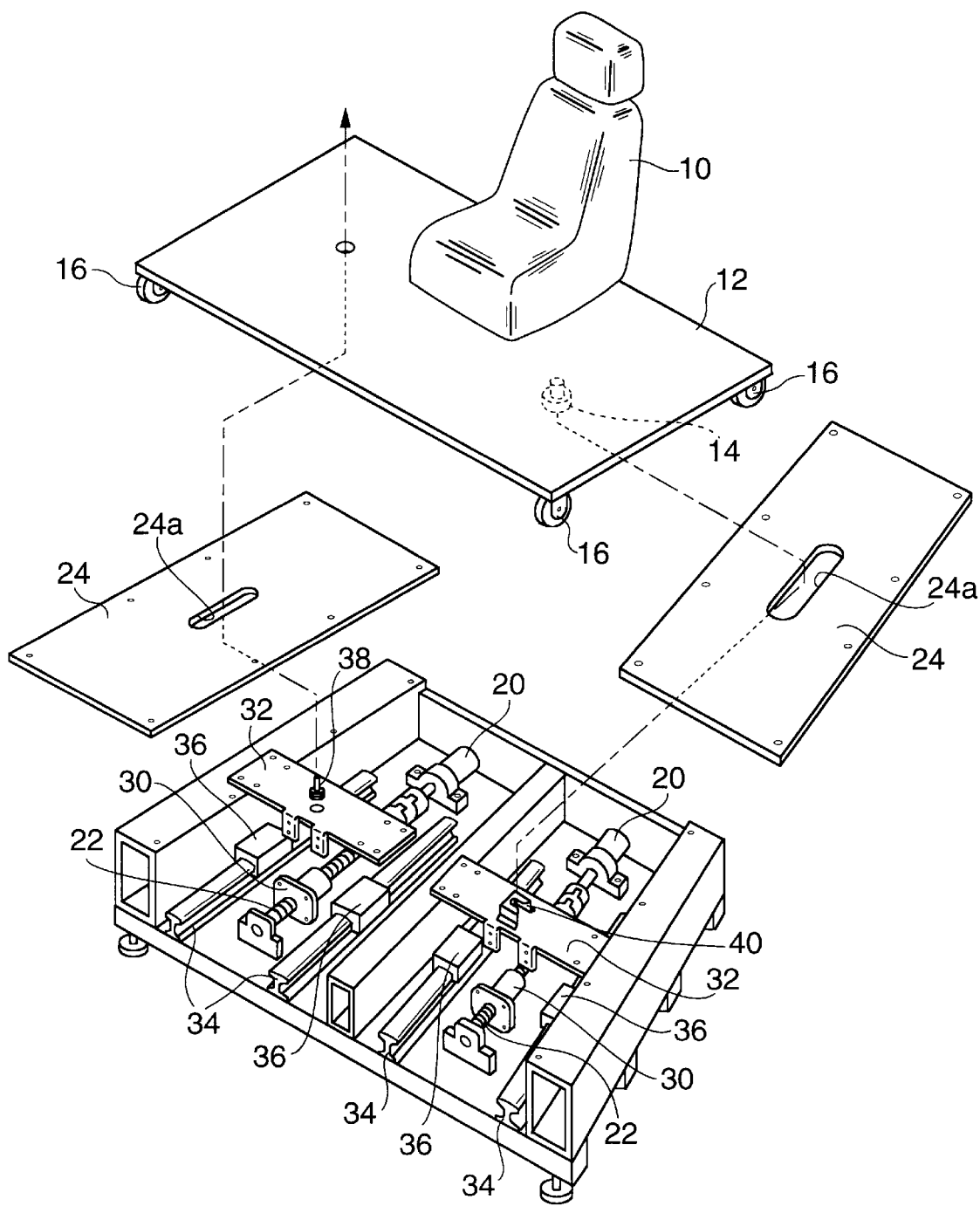
FIG. 1 is an exploded diagram showing the structure of the rotary sliding device according to the present invention.

The preferred embodiment of the present invention will now be described with reference to the accompanying drawings. FIG. 1 is an exploded diagram showing a structure of the rotary sliding device of the present invention. The rotary sliding device shown in FIG. 1 is able to slide a seat 10 back and forth and turn right and left. In detail, the seat 10 is fixed to a moving plate 12, and the seat 10 moves together with the movement of this moving plate 12. The mechanism thereof will be described below.

As shown in FIG. 1, this rotary sliding device is provided with two stepping motors 20. To the rotation axis of each stepping motor 20 is attached a helical body 22, respectively, on which a screw is formed like a bolt. Furthermore, each helical body 22 is spaced apart and arranged in parallel. Stepping motors 20 are arranged corresponding thereto. Stepping motors 20 and helical bodies 22 constitute a driving means.

Portions to be screwed 30 on which a female screw is respectively formed like a nut are engaged with the helical bodies 22. Therefore, the rotation of the stepping motors 20 cause the rotation of the helical bodies 22, and when the portions to be screwed 30 are supported so as not to be rotated, the portions to be screwed 30 are moved straightforward along the axis of the helical bodies 22 because of screwing of the helical bodies 22 and portions to be screwed 30. The portions to be screwed 30 are fixed to sliding plates 32 and the rotation thereof is restrained. Furthermore, since the portions to be screwed 30 which are moved by screwing with the helical bodies 22 are decelerated, they can generate a large force.

The sliding plates 32 are fixed to a moving portion 36 which slide on a guide rail 34, therefore they slide together with the moving portion 36. In addition, the guide rail 34 is arranged in parallel with the axis of the helical bodies 22, therefore it slides in parallel with the axis of the helical bodies 22. Thus, the portions to be screwed 30 move straightforward, and the sliding plates 32 move straightforward along therewith.

A rotation axis 38 is arranged on one sliding plate 32 (on the left side in the drawing), and this rotation axis 38 is rotatably attached to the moving plate 12.

On the other sliding plate 32 (on the right side in the drawing), there is arranged a movement-regulating portion 40. The movement-regulating portion 40 is so arranged to engage with a roller 14 provided on the moving plate 12 in a predetermined direction, and not to engage therewith in other directions. In detail, the movement-regulating portion 40 is so formed that regulating plates are arranged back and forth in the straight moving direction of the sliding plates 32 to put the roller 14 therebetween. Thereby, the roller 14 and the movement-regulating portion 40 abut to each other in a sliding direction of the sliding plates 32 to regulate the movement in this direction. Furthermore, the movement-regulating portion 40 is opened in a direction orthogonal to the sliding direction of the sliding plates 32, and the roller 14 can move in this direction. Furthermore, since the roller 14 itself rotates, it is possible that the sliding plates 32 and the moving plate 12 move relatively.

In this embodiment, sliding plates 32 and portions to be screwed 30 become the straight movement means to move the moving plate 12 and the seat 10 which are the object to be moved. For that purpose, compartment plates 24 are provided on the sliding plates 32, and wheels 16 are provided at the back of the moving plate 12, so that the moving plate 12 can move on the compartment plates 24. In addition, on the compartment plates 24, there are formed holes 24a so as not to block the connection between the rotation axis 38 and the movement-regulating portion 40, and the moving plate 12.

The present embodiment is constituted as described above, and the action thereof will now be described. First, in FIG. 1, when both sliding plates 32 move simultaneously in the same direction, the moving plate 12 and the seat 10 slide in the same direction. In detail, by inputting the same pulse signal to both the stepping motors 20, the helical bodies 22 rotate in the same direction at the same revolutions. Then, corresponding thereto, both the portions to be screwed 30 move straightforward in the same direction, while both the sliding plates 32 move straightforward in the same direction. And the rotation axis 38 of one sliding plate 32 and the movement-regulating portion 40 of the other sliding plate 32 let the moving plate 12 move simultaneously in the same direction. Thus, the seat 10 slides straightforward.

Furthermore, for example, when the sliding plate 32 on which the rotation axis 38 is provided moves forward from the seat 10, and the sliding plate 32 on which the movement-regulating portion 40 is provided moves backward from the seat 10, the seat 10 turns left.

In detail, when the rotation axis 38 moves forward together with one sliding plate 32, the moving plate 12 moves forward in the connected portion with the rotation axis 38. On the contrary, since the other sliding plate 32 moves backward, the moving plate 12 moves backward in the portion where the roller 14 is attached. As described above, the connected portion with the rotation axis 38 and the portion where the roller 14 is attached are moved in the opposite direction, therefore the moving plate 12 rotates. That is, the seat 10 turns around.

In addition, when one sliding plate 32 and the other sliding plate 32 moves in the opposite direction, the distance between the rotation axis 38 and the movement-regulating portion 40 changes. Therefore, in order to fit to the distance change, the roller 14 moves in the orthogonal direction to the sliding direction to the movement-regulating portion 40.

According to the present embodiment, by combining the above action, the seat 10 can be slid back and forth, and turned right or left. Furthermore, since stepping motors 20 are used for driving the object to be moved, it becomes possible to make it move rapidly and correctly as operated by the player. Furthermore, screwing of the helical bodies 22 and the portions to be screwed 30 decelerates the transmitted movement, thereby a large force can be generated and more rapid movement becomes possible. Or, even if the driving force of the stepping motors 20 is small, the seat 10 can be driven.

Figure 2A:
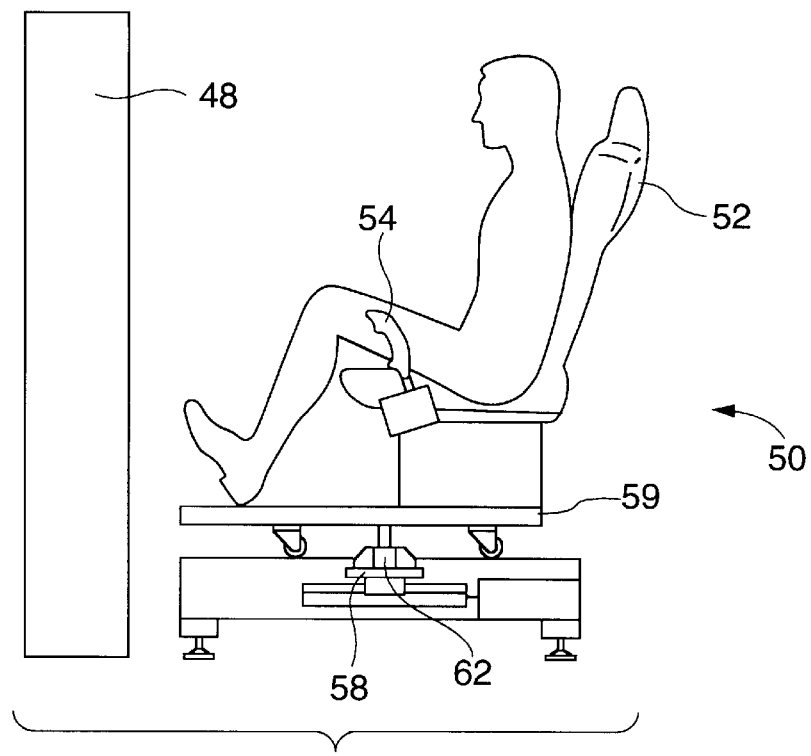
FIG. 2A is a side view of a simulator and FIG. 2B is a back view thereof according to one embodiment.
Figure 2B:
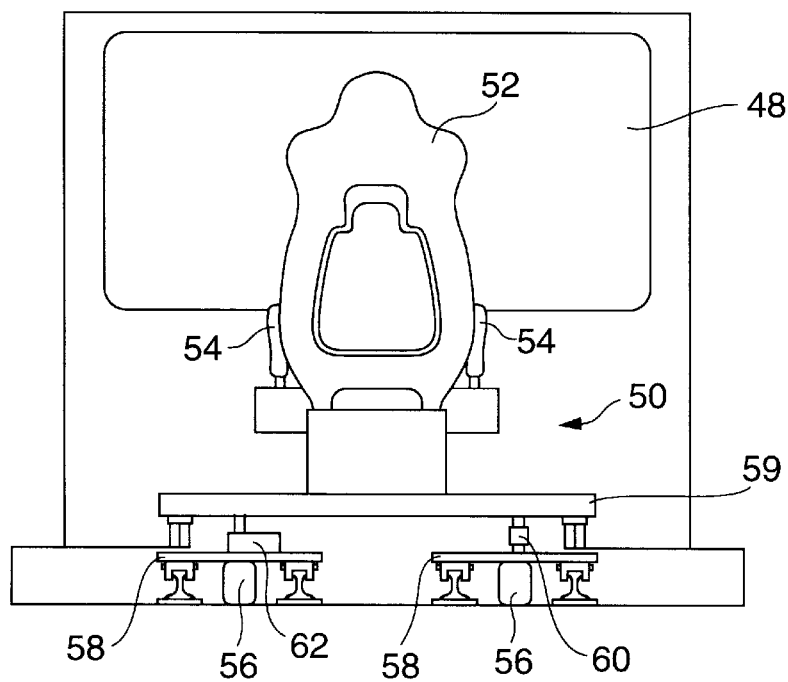
Figure 3A:
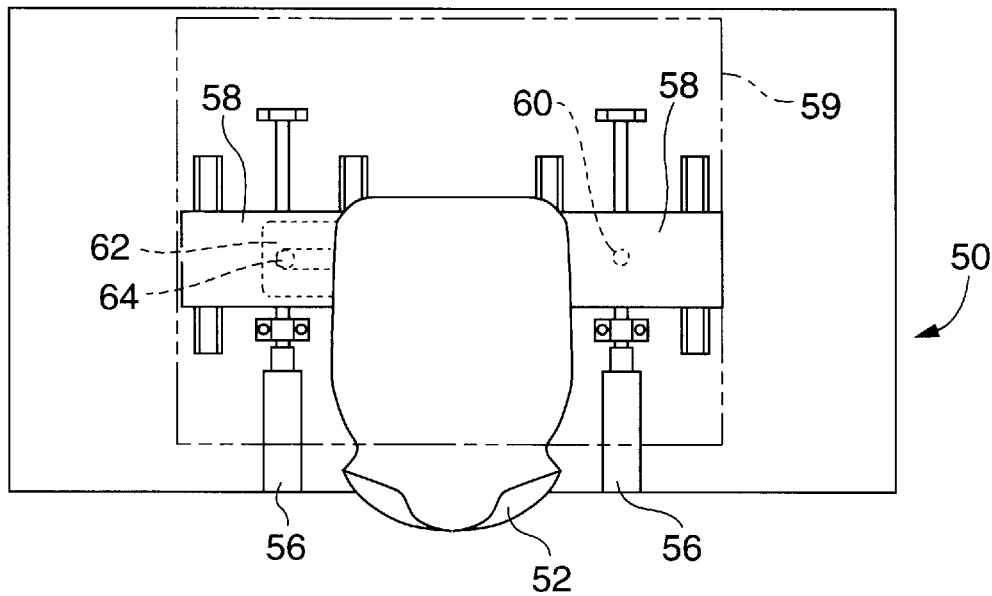
FIGS. 3A and 3B are views illustrating the action of the simulator according to one embodiment.
Figure 3B:
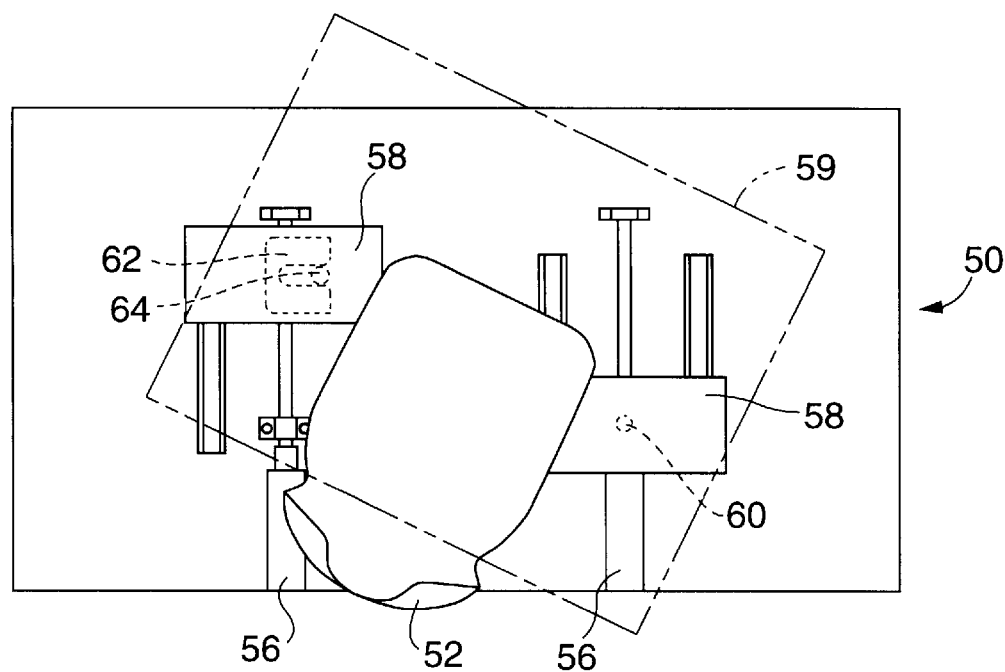

Next, the simulator to which the present invention is applied will be described. FIG. 2A is a side view of a simulator according to the present embodiment, and FIG. 2B is a back view thereof. Furthermore, FIG. 3A and FIG. 3B are views illustrating the action of the simulator according to the present embodiment. In addition, the present embodiment is a simulator as a game device for playing a combat game by operating a combat car, but it may be applied to a simulator for training other than this.

As shown in FIGS. 2A and 2B, the simulator according to the present embodiment includes a display 48 and a rotary sliding device 50. On the display 48, pictures such as battle fields and combat cars of the enemy are projected. And the rotary sliding device 50 has a seat 52 where a player sits, and on both sides of this seat 52, operation levers 54 are provided.

The operation levers 54 is provided with a button for attack (not shown) so that the player can attack the combat car of the enemy, and the seat 52 can be slid as well as turned around.

Concretely, if the operation levers 54 on both sides are pushed down forward, the seat 52 slides forward. At this time, the backrest of the seat 52 applies a force to the player, the player has a feeling that the combat car which is operated by him/her accelerates all of a sudden. On the contrary, if the operation levers 54 on both sides are pushed down backward, the seat 52 slides backward, and the player has a feeling that the combat car decelerates all of a sudden.

Or, if the operation lever 54 on the left side is pushed down forward, and the operation lever 54 on the right side is pushed down backward, the seat 52 turns right. On the contrary, if the operation lever 54 on the left side is pushed down backward, and the operation lever 54 on the right side is pushed down forward, the seat 52 turns left.

The structure to perform these actions is almost the same as the structure shown in FIG. 1. That is, as shown in FIG. 3A and FIG. 3B, the rotary sliding device 50 is provided with two stepping motors 56, and the rotation of each stepping motor 56 causes the separate sliding plates 58 to slide. On one sliding plate 58, a rotation axis 60 is provided. And on the other sliding plate 58, a movement-regulating portion 62 is provided, and a roller 64 corresponding thereto is provided on a moving plate 59.

The moving plate 59 moves corresponding to the movement of each sliding plate 58, and the seat 52 moves together with this moving plate 59. For example, as shown in FIG. 3B, if the sliding plate 58 on the left side moves forward, and the sliding plate 58 on the right side moves backward, the seat 52 turns right.

With regard to the other structure and action, they are substantially the same with those of the rotary sliding device shown in FIG. 1, therefore the description thereof will be omitted.

Figure 4A:
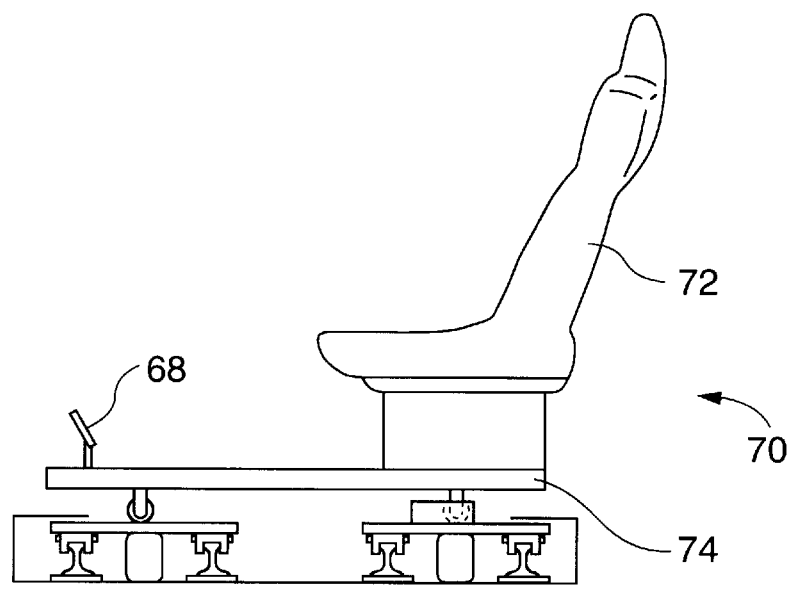
FIG. 4A is a side view of a simulator and FIG. 4B is a back view thereof according to another embodiment.
Figure 4B:
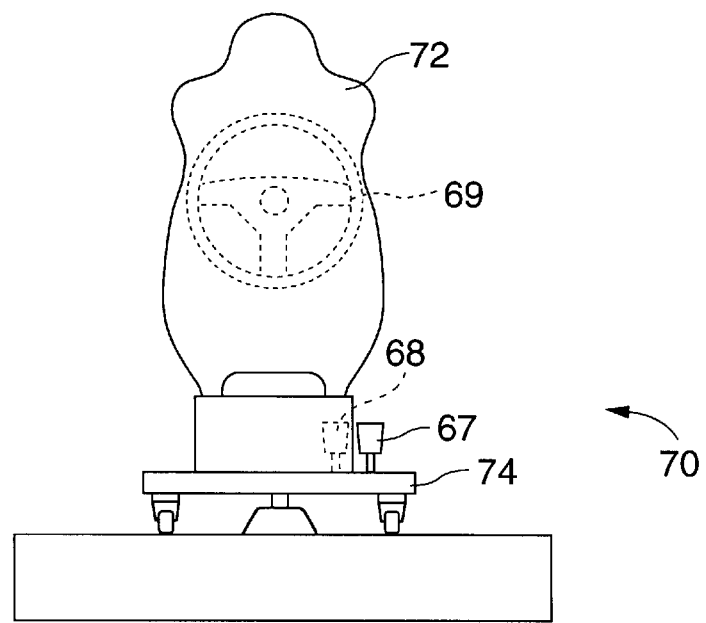
Figure 5A:
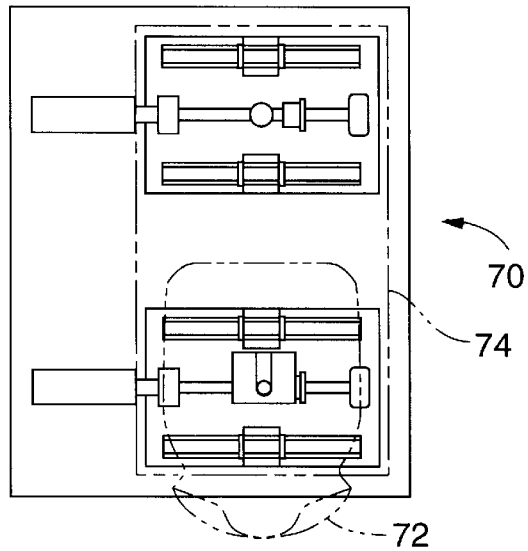
FIGS. 5A, 5B and 5C are views illustrating the action of the simulator according to another embodiment.
Figure 5B:
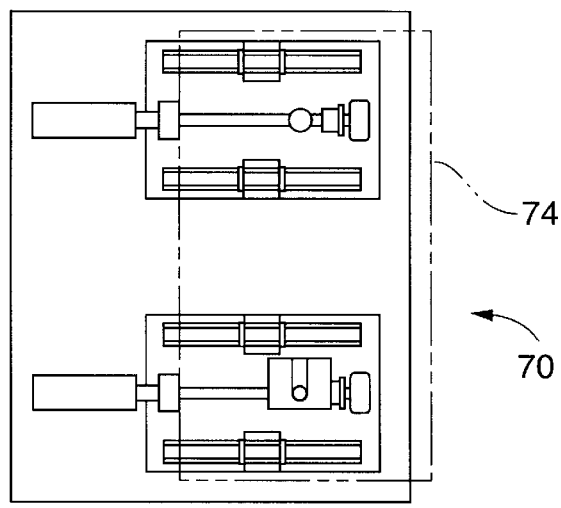
Figure 5C:
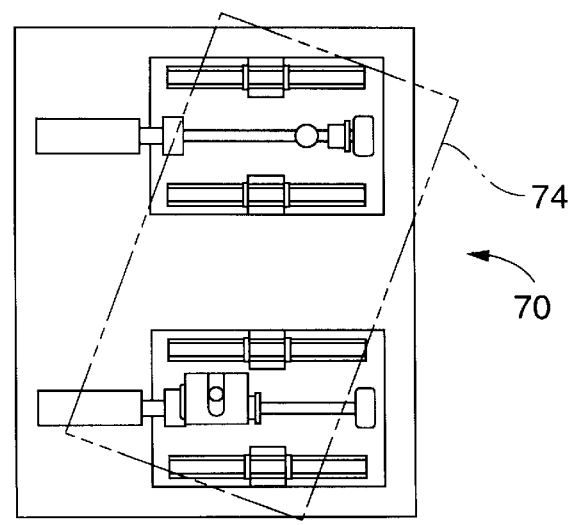

The present invention is not restricted to the embodiment described above, and various modifications are possible. For example, the rotary sliding device according to the present invention can be used for other applications other than the above simulator. FIG. 4A is a side view of such other simulator, and FIG. 4B is a back view thereof. Furthermore, FIGS. 5A to 5C are views illustrating the action of this simulator. In addition, the present embodiment is a simulator as a game device for performing a racing game by driving a racing car, but it may be used as a simulator for training.

With the simulator according to the present embodiment, a racing course and other racing cars are projected on a display not shown, and a seat 72 moves by the operation of an accelerator 67, a brake 68 and a steering wheel 69 so that the player can have the actual feeling of the race.

In detail, as shown in FIGS. 5A to 5C, a moving plate 74 fixed to the seat 72 can slide from side to side, designating the direction of the seat 72 as the standard, as well as it can change the direction. The structure for that purpose is substantially the same as that of the rotary sliding device shown in FIG. 1 except of the relative direction of the moving plate and the seat, therefore detailed description will be omitted.

According to the present embodiment, the sliding of seat 72 from side to side gives a player the feeling of gravity when the car turns the corner. For example, as shown in FIG. 5B, if the seat 72 slides in the right direction, a force is applied to the player in such a manner that the left side of the seat 72 is pushed to the player. The feeling at this time is equal to the feeling when the player actually drives a car and turns right.

Particularly, if the seat 72 slides abruptly, the player can feel that energy and can also feel the cornering and know the tire is gripping effectively. If the seat 72 slides gradually, the player may have the feeling that the tire is slipping.

Furthermore, when cornering in the actual driving, the direction is naturally changed. Therefore, in addition to the movement from side to side described above, the seat 72 is turned right and left. Thus, the player can have a feeling that he/she takes the wheel in the actual driving.

By way of example, the seat 10 may also be referred to as an object to be moved, the moving plate 12 may also be referred to as an object to be moved, the roller 14 may also be referred to as a rotating portion, the stepping motor 20 may also be referred to as a driving means, the helical body 22 may also be referred to as a driving means, the portion to be screwed 30 may also be referred to as a straightforward moving means, the sliding plate 32 may also be referred to as a straightforward moving means, and the rotation axis 38 may also be referred to as a rotating portion. It should be understood, however, that these are examples of alternative names and that other alternative names may be used in accordance with the present invention.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A rotary sliding device for translating or rotating an object, said device comprising:
   a base;
   an object to be moved;
   first linear guide means mounted on the base and having a moveable portion that is coupled to the object by a rotary coupling;
   second linear guide means mounted on the base and having a moveable portion that is coupled to the object by a sliding coupling, wherein the first and second linear guide means permit movement along parallel directions;

first driving means for moving the first linear guide means; and second driving means for moving the second linear guide means independently of the first driving means.

2. The rotary sliding device according to claim 1, wherein each driving means includes a helical body and a motor for rotating said helical body, and further includes a screw nut engaging the helical body and coupled to the moveable portion of one of the bearing means.

3. A motion simulator, comprising:

a base;

first linear guide means mounted on the base and having a moveable portion that is moveable along a direction of travel;

second linear guide means mounted on the base and having a moveable portion that moves parallel to the direction of travel;

first driving means for moving the first linear guide means along the direction of travel;

second driving means for moving the second linear guide means along the direction of travel independently of the first driving means;

a platform supported for movement in a plane;

a rotary coupling that couples the platform to the moveable portion of the first linear guide means; and a sliding coupling that couples the platform to the moveable portion of the second linear guide means.

4. The simulator according to claim 3, wherein each driving means includes a helical body and a motor for rotating said helical body, and further includes a screw nut engaging the helical body and coupled to the moveable portion of one of the bearing means.

5. The simulator according to claim 3 further comprising a seat mounted on the platform.

6. The simulator according to claim 5 wherein the seat is aligned with the direction of travel.

7. The simulator according to claim 5 wherein the seat is positioned transverse to the direction of travel.

8. The simulator according to claim 3 further comprising means for operating said pair of driving means to slide each of said first and second linear guide means in different directions to rotate the platform.

9. The simulator according to claim 3 further comprising means for operating said pair of driving means to slide each of said first and second linear guide means in the same direction to translate the platform.

10. The simulator according to claim 3 further comprising two levers for use by an operator and operatively connected to the pair of driving means.

11. The simulator according to claim 3 further comprising an accelerator, a brake, and a steering wheel for use by an operator and operatively connected to the pair of driving means.

12. The simulator according to claim 5 wherein the seat slides in the same direction as that of a force applied to an operator in a virtual space.

13. A rotary sliding device for translating or rotating an object, said device comprising:

an object to be moved;

a first sliding structure having a first plate connected to said object so as to allow it to rotate only around a first rotating portion, said first sliding structure configured to permit said first plate to slide in a straight sliding direction;

a second sliding structure, positioned parallel to said first sliding structure, having a second plate connected to said object so as to engage therewith in said sliding direction and to allow said object to move in a cross direction and to rotate around a second rotating portion, said second sliding structure configured to permit said second plate to slide in said sliding direction separately from said first sliding structure;

a first drive connected to the first sliding structure and configured to slide the first plate; and a second drive connected to the second sliding structure and configured to slide the second plate.

14. The rotary sliding device according to claim 13, wherein each drive includes a helical body and a motor for rotating said helical body, and further includes a screw nut engaging the helical body and coupled to the plate of one of the sliding structures.

15. The rotary sliding device according to claim 13 wherein the object to be moved is a seat on which a player may sit.

16. The rotary sliding device according to claim 15 wherein the seat is aligned with the sliding direction.

17. The rotary sliding device according to claim 15 wherein the seat is positioned transverse to the sliding direction.

18. The rotary sliding device according to claim 13 further comprising means for operating the drives to slide each of the plates in opposite directions to rotate the object.

19. The rotary sliding device according to claim 13 further comprising means for operating the drives to slide each of the plates in the same direction to translate the object.0

* * * * *